(12) United States Patent
Sheng

(10) Patent No.: US 6,363,975 B1
(45) Date of Patent: Apr. 2, 2002

(54) BONDING OF STEEL STRIPS IN STEEL STRIP LAMINATE PIPE

(75) Inventor: Qizhong Sheng, Cerritos, CA (US)

(73) Assignee: Ameron International Corporation, Pasadena, CA (US)

( * ) Notice: Subject to any disclaimer, the term of this patent is extended or adjusted under 35 U.S.C. 154(b) by 0 days.

(21) Appl. No.: 09/442,137

(22) Filed: Nov. 17, 1999

Related U.S. Application Data

(60) Provisional application No. 60/108,880, filed on Nov. 17, 1998.

(51) Int. Cl.[7] ................................................ F16L 11/08
(52) U.S. Cl. ................ 138/143; 138/133; 138/138; 138/141; 138/DIG. 1
(58) Field of Search ................ 138/143, 141, 138/137, DIG. 1, 133, 125, 153, 127, 132, 138, 172

(56) References Cited

U.S. PATENT DOCUMENTS

| | | | |
|---|---|---|---|
| 4,351,364 A | | 9/1982 | Cocks .................. 138/133 |
| 5,139,601 A | * | 8/1992 | Holmes-Farley et al. ... 156/329 |
| 5,330,794 A | * | 7/1994 | Bosco et al. ............ 427/387 |
| 5,360,037 A | * | 11/1994 | Lindstrom ............. 138/138 |
| 5,476,717 A | * | 12/1995 | Floch .................. 428/421 |
| 5,520,223 A | | 5/1996 | Iorio et al. ............ 138/140 |
| 5,579,809 A | * | 12/1996 | Milward et al. .......... 138/174 |
| 5,633,038 A | * | 5/1997 | Ruschau ............... 427/239 |
| 5,713,393 A | * | 2/1998 | Johnson et al. .......... 138/146 |
| 5,771,940 A | | 6/1998 | Iorio et al. ............ 138/146 |
| 5,785,092 A | * | 7/1998 | Freidrich et al. ........ 138/133 |
| 5,814,137 A | * | 9/1998 | Blohowiak et al. ...... 106/14.13 |
| 5,902,392 A | * | 5/1999 | Henkelman et al. ...... 106/260 |

* cited by examiner

*Primary Examiner*—Patrick Brinson
(74) *Attorney, Agent, or Firm*—Christie, Parker & Hale, LLP

(57) ABSTRACT

A steel strip laminate pipe having increased lap shear strength and peel off strength between the steel layers in the pipe and a method for making such a steel strip pipe are provided. Steel strips coated with a sol-gel or a silane adhesion promoter are wound over an inner lining to form steel layers bonded to each other in a steel strip laminate pipe. In an alternate embodiment, fiber fillers and resin are used to bond the steel layers in the pipe together. In further embodiment, glass sphere and resin are used to bond the steel layers together. The steel strips bonded together using continuous reinforced fiber filler or glass spheres may be coated with sol-gel or silane. In an alternate embodiment, the sol-gel or silane may also be mixed in the resin used to bond the steel layers together.

20 Claims, 14 Drawing Sheets

EXAMPLES OF X-GROUP (a) -Cl (b) -OCH$_3$ (c) -OC$_2$H$_5$ (d) -OCH$_2$CH$_2$OCH$_3$ (e) -OCH$_2$CH$_3$

EXAMPLES OF Y-GROUP (a) -C$_2$H$_5$ (b) -CH$_2$=CH- (c) -CH$_2$=C(CH$_3$)-C(=O)-O-

(d) -OCH$_2$CHOCH$_2$ (f) -NH$_2$

FIG. 9

| ABBREVIATION | CHEMICAL NAME | STRUCTURE FORMULA |
|---|---|---|
| MPS | γ-MERCAPTOPROPYLTRIMETHOXYSILANE | $H_2NCH_2CH_2CH_2Si(OCH_3)_3$ |
| GPS | γ-GLYCIDOXYPROPYLTRIMETHOXYSILANE | $(O-C_2H_3)CH_2OCH_2CH_2CH_2Si(OCH_3)_3$ |
| TEOS | TETRAETHOXYSILANE | $Si(OC_2H_5)_4$ |
| APS | γ-AMINOPROPYLTRIETHOXYSILANE | $H_2NCH_2CH_2CH_2Si(OCH_2CH_3)_3$ |
| BTSE | Bis-1,2-(TRIETHOXYSILYL)ETHANE | $(C_2H_5O)_3SiCH_2CH_2Si(OC_2H_5)_3$ |

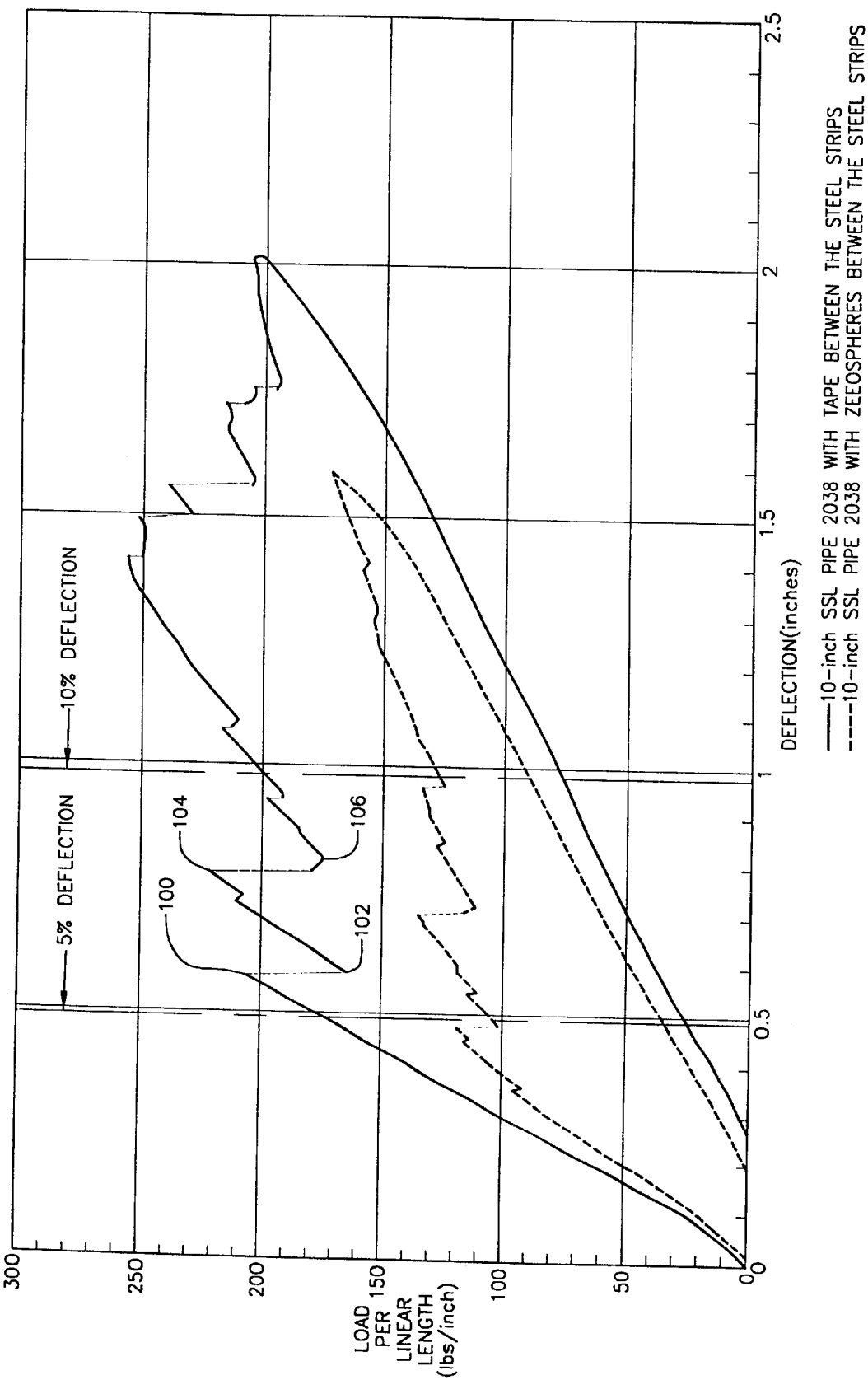

FIG. 14

| TYPE OF FILLER MATERIAL | PERFORMANCE FACTORS | | | PRODUCTION FACTORS | | |
|---|---|---|---|---|---|---|
| | ORIGINAL LAP SHEAR STRENGTH AT 230°F | LAP SHEAR STRENGTH RETENTION AFTER HOT WATER EXPOSURE | PEEL STRENGTH | RESIN DEBULKING TIME | EASY APPLICATION | MATERIAL COST |
| ZEEOSPHERES | HIGH | HIGH | LOW | SHORT | NO | LOW |
| WOVEN CLOTH | MODERATE | MODERATE | HIGH | LONG | YES | HIGH |
| MONOFILAMENT MESH | HIGH | LOW | MODERATE | SHORT | MAYBE | MODERATE |
| RANDOM SYNTHETIC VEIL | HIGH | MODERATE | HIGH | MODERATE | YES | MODERATE |

FIG. 15

| SURFACE TREATMENT | FILLER MATERIAL | LAP SHEAR STRENGTH AT 230°F(PSI) | | PEEL-OFF STRENGTH | DEBULKING TIME(SEC.) |
|---|---|---|---|---|---|
| | | INITIAL | AFTER HOT WATER EXPOSURE | | |
| SANDBLAST | ZEEOSPHERES | 2640 | 560 (505 HRS) | — | — |
| SOL-GEL | ZEEOSPHERES | 2750 | 2360 (820 HRS) | 19 lb/LF | 9 |
| | REEMAY | 3270 | 2080 (400 HRS) | 93 lb/LF | 25 |
| | FREUDENBERG LD | 3250 | 1470 (400 HRS) | 158 lb/LF | 25 |
| SILANE | ZEEOSPHERES | 4320 | 3280 (820 HRS) | — | — |
| | REEMAY | 3626 | 2160 (820 HRS) | — | — |
| | FREUDENBERG LD | 3260 | | — | — |

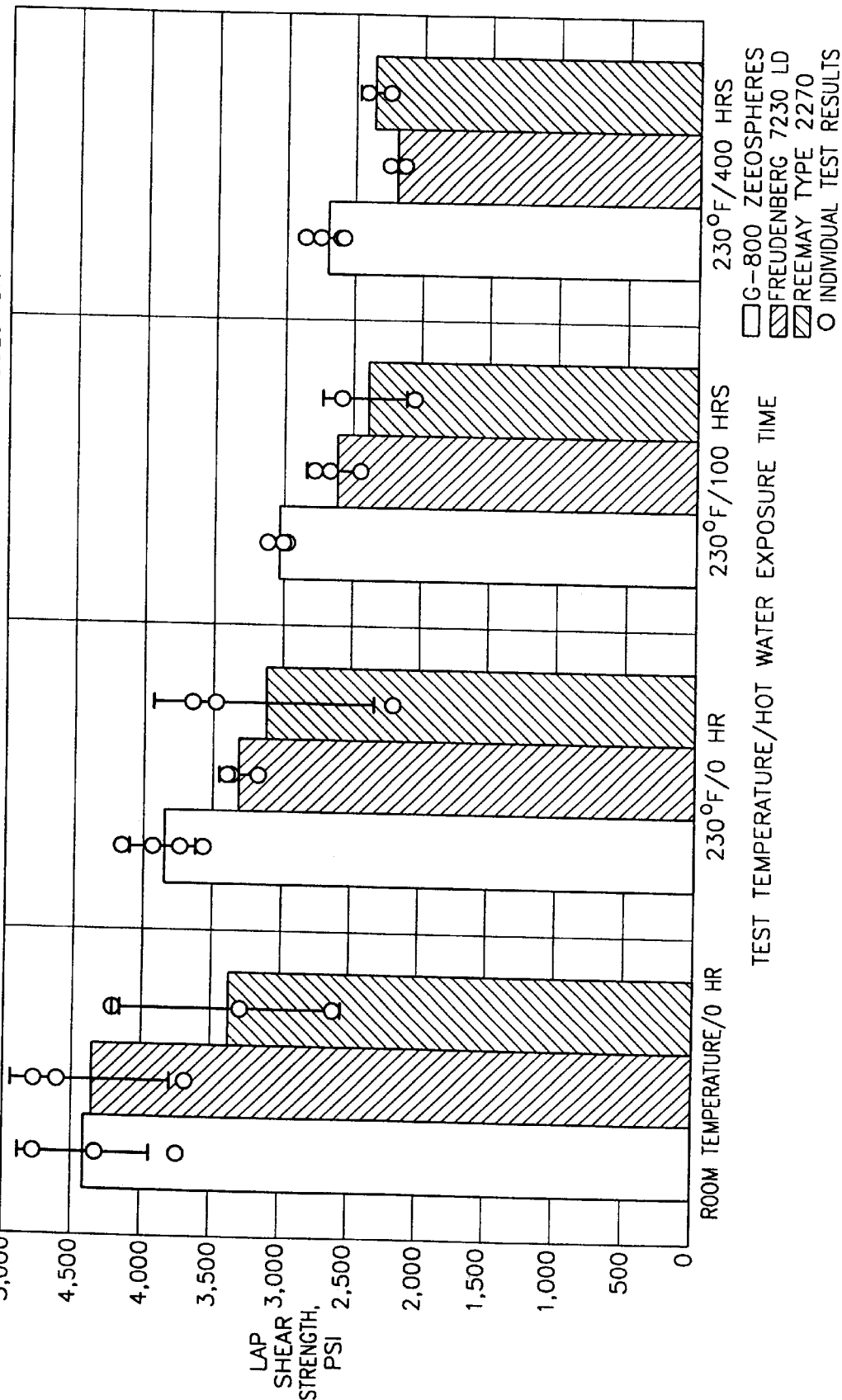

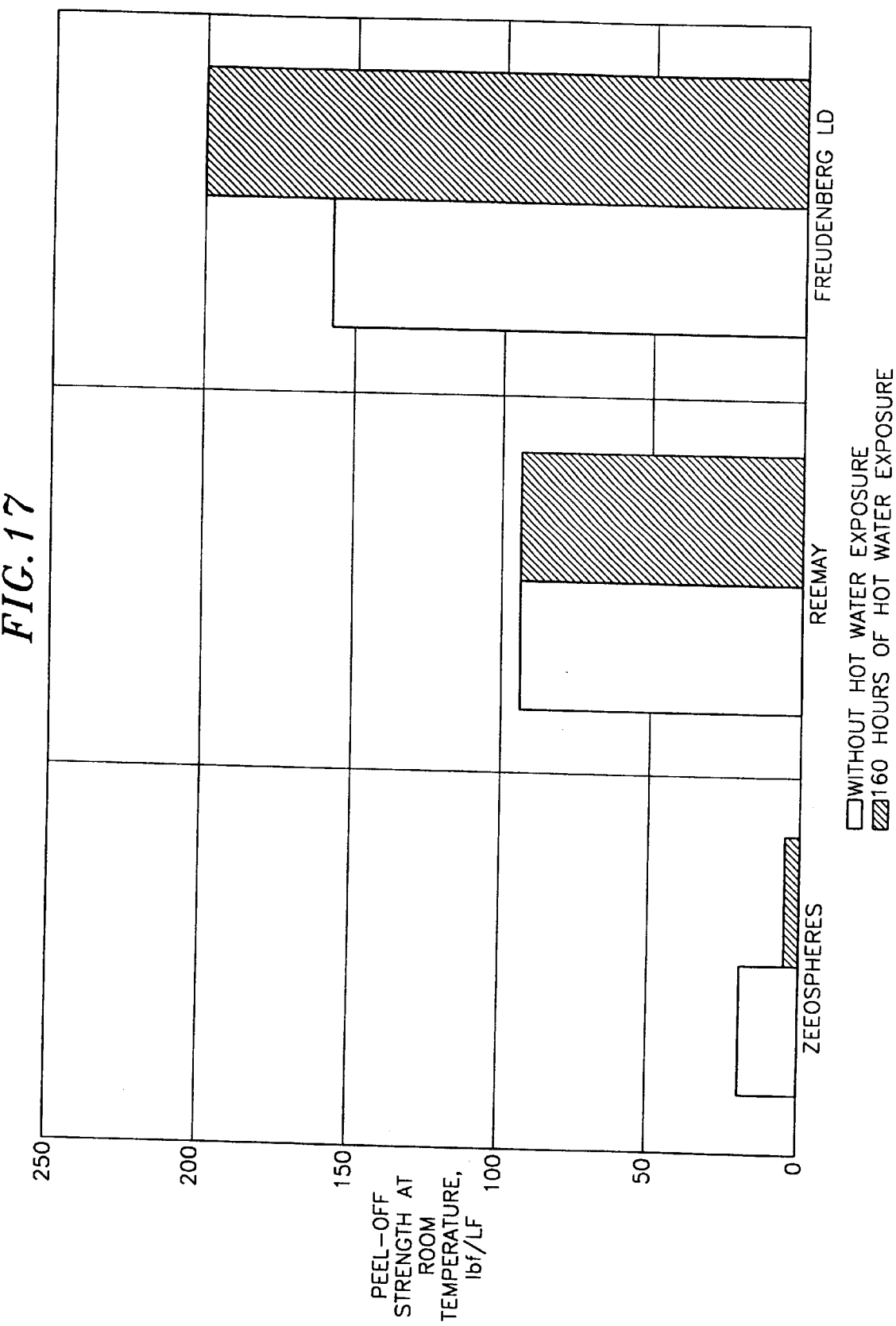

BONDING OF STEEL STRIPS IN STEEL STRIP LAMINATE PIPE

CROSS-REFERENCE TO RELATED APPLICATION

This application claims priority and is based upon U.S. Patent Provisional Application No. 60/108,880, filed on Nov. 17, 1998, which is fully incorporated herein by reference.

BACKGROUND OF THE INVENTION

High pressure conduits, such as oil and gas pipe lines have generally been constructed with conventional steel pipes. These pipelines are subject to both internal and external pressures. Internal pressure is required to transport the fluid or gases within the pipeline. External pressure is created by the weight of soil or water on the pipeline when the pipeline is embedded in the ground or submerged in water.

While steel pipes provide the requisite strength for withstanding the internal and external pressures, they have a high susceptibility to corrosion. A corrosive environment is fostered by contact between the internal foreign media (e.g., the liquids or gases being transported by the pipeline) and the steel, or by contact with external conductive foreign media and the steel. The external foreign media could be soil in cases where the pipe is buried under ground, or sea water in cases where the pipe is submerged in an ocean or water in cases where the pipe runs along sewer systems or exposed to rain. Corrosion decreases the pipe strength and may cause the pipe to leak or burst under pressure.

To overcome this disadvantage, steel reinforced composite pipes have been developed. These pipes have a wall of steel coated with a polymeric material, or of steel embedded in the fiber reinforced composite, such as a fiber glass resin system. The coating or resin system protects the steel from corrosion by shielding it from any contact with the foreign media. One example of steel reinforced composite pipe is disclosed in the Cocks Patent, U.S. Pat. No. 4,351,364, the subject matter of which is hereby incorporated by reference. The pipe disclosed therein is a structural wall section sandwiched between inner and outer linings. The linings are resin rich layers reinforced with glass or other fibers. The structural wall section is made of three or more structural steel reinforcing layers coated with structural epoxy resin. The individual layers of the pipe are successively built up, one upon the other, on a mandrel or pipe winding machining. Each lining layer is formed by helically winding resin wetted fiber rovings. Each steel layer is formed by helically winding a steel strip coated with resin. The steel layers are wound one on top of the other. Once "wound" the pipe is cured. This type pipe is commonly referred to as steel strip laminate pipe or "SSL pipe".

Typically the desired lap sheer strength between overlapping steel layers in SSL pipe is 1800 psi. Such a strength cannot be achieved by adhering one steel layer to the other using only a resin system. In order to achieve such strength, it is common to sandblast the steel prior to winding for forming the steel layers in the pipe.

Sandblasting creates a mechanical roughness on the steel providing a stronger mechanical/adhesive bonding. However, this bonding does not have long term durability under wet environments. Testing of a lap shear specimen consisting of sandblasted steel specimens bonded using EPON 826/IPD adhesive showed an 80% lap sheer strength loss after 505 hours of hot water exposure. Moreover, the aging of the sandblasted steel surface significantly reduces lap shear strength due to surface oxidation. Furthermore, sandblasting is a burdensome process. Typically, a 5000 horsepower air compressor would be required to sandblast production quantities of steel strips. A special facility would also be needed due to the dusty and noisy nature of sandblasting.

As such, a system is needed for bonding the steel strip formed layers to each other and to the SSL pipe linings that would avoid the need for sandblasting the steel strips.

It has also been discovered that steel strip layers, bonded to each other with only a resin have inadequate peel strength. The inadequate peel strength is believed to be caused by a variance in the bond thickness along the length of the steel strip forming the layer. Resin bond thickness control is typically not very accurate at production speeds.

Glass flake fillers are sometimes used in the resin to improve the shear strength between steel strips. Typically, glass flake fillers make up about 5 to 10% of the resin by weight. However, even with the use of glass flake fillers it is difficult to control the bond thickness between the strips at production speeds, thus, resulting in inadequate strip peel strength.

Another problem with the bonding of the steel strips to each other in SSL pipes is cracking of the resin matrix between the steel strips also resulting in reduction of the peel strength. A further problem is resin shrinkage which occurs during curing and also results in a decreased bond strength between the steel strips.

SSL pipes are typically subjected to hot and wet conditions and the bond between the steel layers often fails under a combined mode failure, i.e., a shear/peel-off failure. As such, it is important that the bonds between the steel layers maintain a significant percentage of their lap shear strength and peel off strength under hot and wet conditions. Moreover, in order to speed up the SSL pipe manufacturing process, it is desirable that the debulking time (i.e., the time required to remove excess resin between the steel strips forming the layers to be bonded) of any resin system used is relatively short so as to reduce manufacturing times and thereby manufacturing costs.

Thus, a resin system is needed which allows for controlling of the bond thickness between adjacent steel strip layers and between the steel strip layers and the linings of the SSL pipe at production speeds. Moreover, a resin system is needed with enhanced crack growth resistance when cured and which is subject to reduced shrinkage during curing. Furthermore, a resin system providing for improved peel and shear strengths between the steel strips of the SSL pipe in hot and wet conditions and which allows for reduced debulking times is desired.

SUMMARY OF THE INVENTION

To improve the lap sheer strength between the steel layers in SSL pipe, an adhesion promoter in the form of a sol-gel or an organofunctional silane is used to coat the steel strips forming the steel layers. In one embodiment, a sol-gel coating is used as the adhesion promoter. Sol is a solution containing partially reacted metal-organic precursors (often a metal-alkoxide such as $—OSi(OR)_3$) in a solvent, usually alcohol. R is a nonhydrolyzable organic radical that possesses a functionality which enables the sol-gel coating to bond with epoxy or other organic resins. Gel is a substance that contains a continuous solid skeleton enclosing a continuous liquid phase formed by reaction in the sol. Sol-Gel processing involves preparation of a solid, usually a film or coating, from sol and gel. Typically, sol-gel is formed by hydrolyzing and condensing the sol solution. Sol-gel coating modified with chromate provides better long-term durability in a hot and wet environment In another embodiment, the steel strips are coated with an organofunctional or bifunctional silane. Organofunctional silane such as Y—R—Si—$X_3$ silane has two classes of functionality. The silane portion, Si, bonds to the inorganic substrate i.e., the steel. The bond between R, a bridging group, and Si is a very stable organic bond, while the bond between X, a hydrolyzable group, and the silicon atom in silane is a less stable inorganic bond and can be replaced by a bond between the inorganic substrate (steel) and the silicon atom.

Because the SSL pipe bonded steel strip formed layers often fail under a combined mode failure, i.e., a shear/peel-off failure, it is desirable for the bonded steel layers to maintain their lap shear strength as well as their peel-off strength under hot and wet conditions. To accomplish this in a preferred embodiment, the present invention incorporates the use of continuous fiber reinforced fillers in the resin used to bond the steel strips. These fillers allow for the control of the bond thickness, improve the shear strength of the bond between steel strips, improve the bond peel strength and reduce resin matrix shrinkage as well as increase the resin matrix resistance to cracking.

Exemplary continuous reinforced fiber fillers are made of Kevlar, carbon, and glass. These fillers are preferably in the form of veils such as random synthetic veils such as C-glass veils, and random veils, woven cloths such as boat tape, and roving tapes, unidirectional tapes, and monofilament meshes.

Veils, woven cloths, tapes and meshes are all in "tape" form, i.e., they are in a continuous layer form. As such, veils, woven cloths, tapes and meshes can be wound over the steel layers. The veils, woven cloths, tapes and meshes may be impregnated with the appropriate resin prior to winding around the steel strip pipe layer. Alternatively, resin may be applied on to a steel strip layer prior to winding the veil, woven cloth, tape, or mesh or the resin may be applied over the wound veil, woven cloth, tape, or mesh. Moreover, instead of using a veil, woven cloth, tape, or mesh material, chopped or crushed fibers may be mixed with the resin in an amount yielding a high fiber content prior to applying the resin over a wound first steel strip layer portion. Alternatively, resin may be applied to the wound steel strip and the crushed or chopped fibers may be applied over the resin. When using fiber fillers, the preferred fiber filler content is in the order of 30 to 70% by volume.

The fibers in a fiber filler serve as a spacer controlling the spacing between subsequent layers of steel and thereby controlling the bond thickness between the steel layers resulting in an improved peel strength.

In an alternate embodiment, instead of a continuous fiber reinforced filler, glass spheres also known as Zeeospheres or microspheres, a discontinuous filler, are used. Due to their spherical shape, Zeeospheres can be densely packed in the resin.

Use of continuous fiber reinforced fillers or Zeeospheres in the resin used to bond the steel strips in SSL pipes improves the operating life of the pipe. These fillers can be used to form a resin matrix that is used to bond steel strips that are treated with an adhesion promoter such as sol-gel or silane, or steel strips that are sandblasted or steel strips that are not treated in any way or form.

Moreover, instead of applying the adhesion promoter to the steel strips, the adhesion promoter may be mixed in the resin used to bond the strips.

BRIEF DESCRIPTION OF THE DRAWINGS

FIG. 9 is a table showing the abbreviation, chemical name and structure formula of the different components incorporated in the organofunctional silanes being compared in FIG. 7.

FIG. 13 is a graph depicting load-deflection curves for SSL pipes with continuous filler impregnated tape between the steel strips and with Zeeospheres between the steel strips when under parallel plate loading.

FIG. 14 is a table comparing various factors considered in selecting a resin filler.

FIG. 15 is a table comparing lap shear strength, peel-off, strength and debulking times of strips bonded with resin incorporating different fillers and coated with sot-gel or an organofunctional silane, or sandblasted.

FIG. 16 is a bar graph depicting to lap shear strength of steel strips coated with an organofunctional silane and bonded using a resin and different fillers after different times of water exposure at 230° F.

FIG. 17 is a bar graph comparing peel off strength of steel strips bonded using different fillers and exposed to water at 230° F. for different times.

DETAILED DESCRIPTION

To improve the lap sheer strength between the steel layers in SSL pipe, an adhesion promoter in the form of a sol-gel or an organofunctional silane is used to coat the steel strips forming the steel layers. These adhesion promoters are used in lieu of sandblasting the steel strips. Resin, such as the EPON 826 resin, still needs to be applied to bond the steel strips as it was applied to bond the steel strips when sandblasted.

In one embodiment, a sol-gel coating is used as an adhesion promoter. Sol is a solution containing partially reacted metal-organic precursors (often a metal-alkoxide such as —OSi(OR)$_3$ or ROSi(OC$_x$H$_{2x+1}$)$_3$) in a solvent, usually alcohol. R is an organic radical that possesses a functionality which enables the sol-gel coating to bond with epoxy or other organic resins. Gel is a substance that contains a continuous solid skeleton enclosing a continuous liquid phase formed by reaction in the sol. Sol-gel processing involves preparation of a solid, usually a film or coating. Typically, sol-gel is formed by hydrolyzing and condensing the sol solution.

Applicants have discovered that the sol-gel coating modified with chromate provided better long-term bond durability in a hot and wet environment. Typically, the chromate is introduced in a primer. The primer is then mixed with the sol-gel solution.

Figure 1:
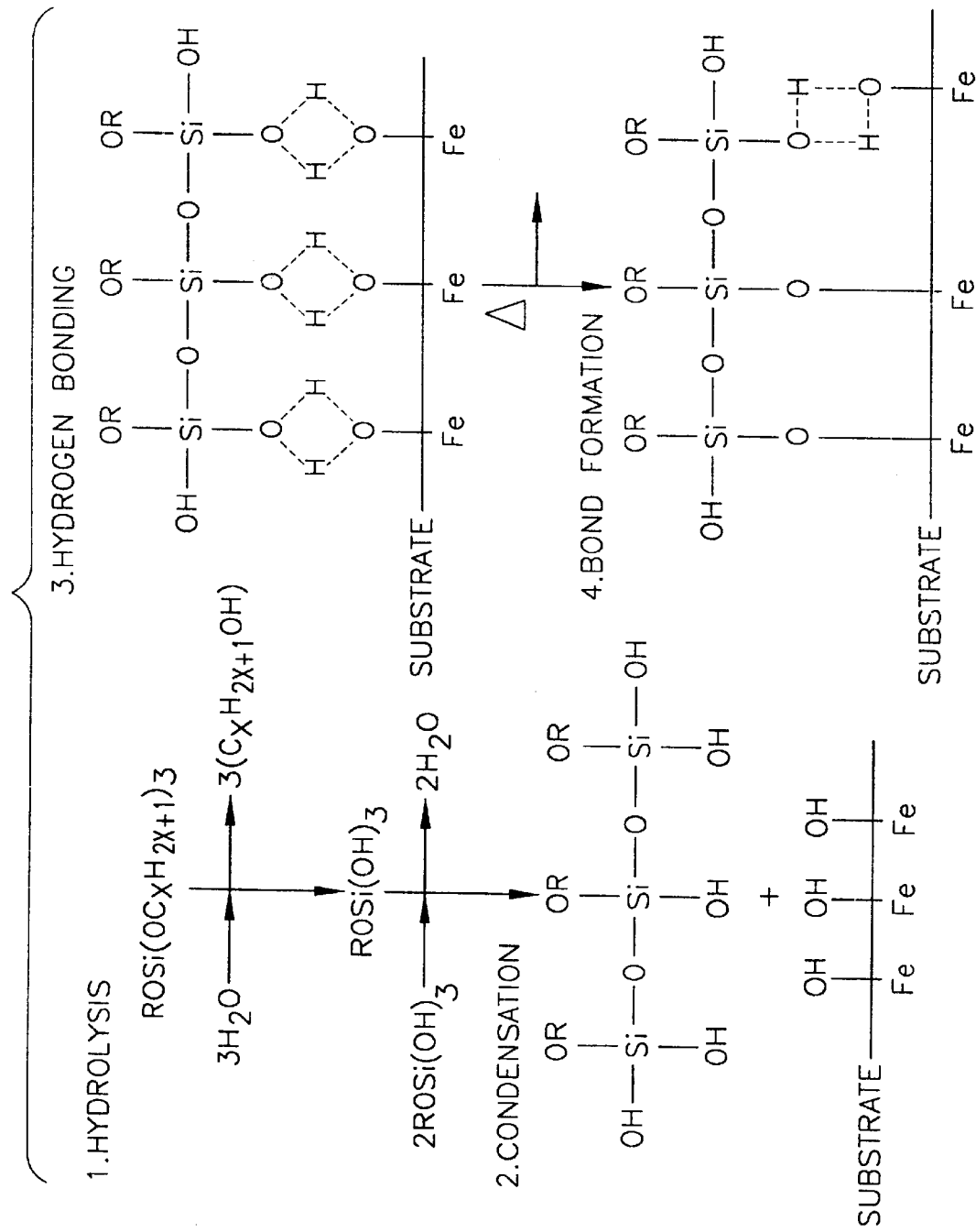
FIG. 1 depicts a schematic of an Fe—O—Si bond formed between a substrate and a sol-gel coating.

In a first embodiment, the steel strips are coated with sol-gel. In an alternate embodiment, the strips may be coated with a sol solution and allowed to undergo hydrolysis and condensation to form a coating of sol-gel on the strips. Once a sol-gel coating is applied or formed on the strip, an Fe—O—Si bond forms between the substrate (steel) and the sol-gel coating in the sequence shown in FIG. 1. The bridge between the sol-gel coating and an epoxy, such as a resin, is an Si—O—R bond shown in FIG. 1. The bridge between the sol-gel coating and the epoxy used to bond the steel in the interpenetrate network (IPN) formed by the Si—O—R bond.

Figure 2:
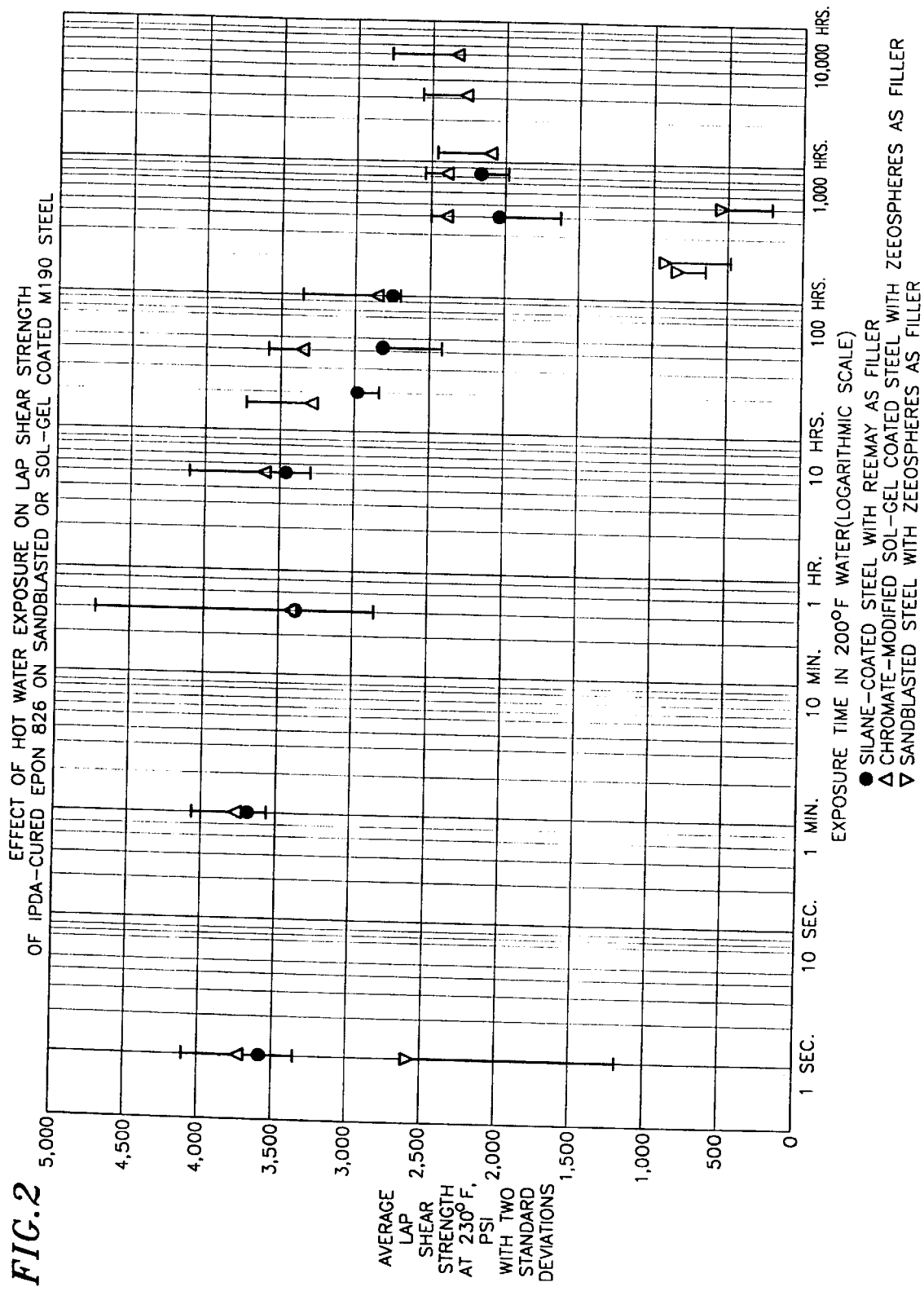
FIG. 2 is a graph of test results depicting the effect of hot water exposure on the lap shear strength of bonded steel strips coated with chromium-modified sol-gel and of sand-blasted steel strips.

Applicants further discovered that use of a sol-gel coating as an alternative surface treatment to sandblasting the steel strips provides for an improved bonding of the steel strips. For example, the lap shear strength of chromium modified sol-gel coated SSL pipe steel strips bonded using EPON 826/IPD is about 40% higher than the lap shear strength of sandblasted, not coated, strips using the same resin at 230° F. (FIG. 2). It should be noted that although testing was performed on specimens bonded with EPON 826/IPD resin, the present invention is not limited to steel strips that are bonded with EPON 826/IPD resin, other resins may also be-used.

Through testing, applicants also discovered that the lap shear strength of chromium modified sol-gel coated steel strips bonded with EPON 826/IPD resin at 230° F. after 500 hours of hot water exposure is about four times of that sandblasted steel strips bonded with the same resin under the same conditions as shown in FIG. 2.

Figures 3, 4, 5:
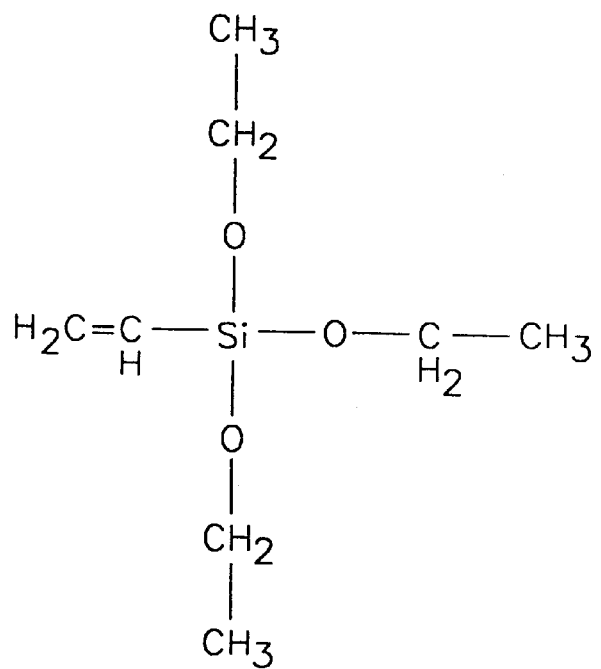
FIG. 3 depicts four exemplary structure formulas of a hydrolyzable group.
FIG. 4 depicts three exemplary structure formulas of nonhydrolyzable organic radicals.
FIG. 5 depicts the structure formula for Vinyltriethoxysilane.
Figure 6:
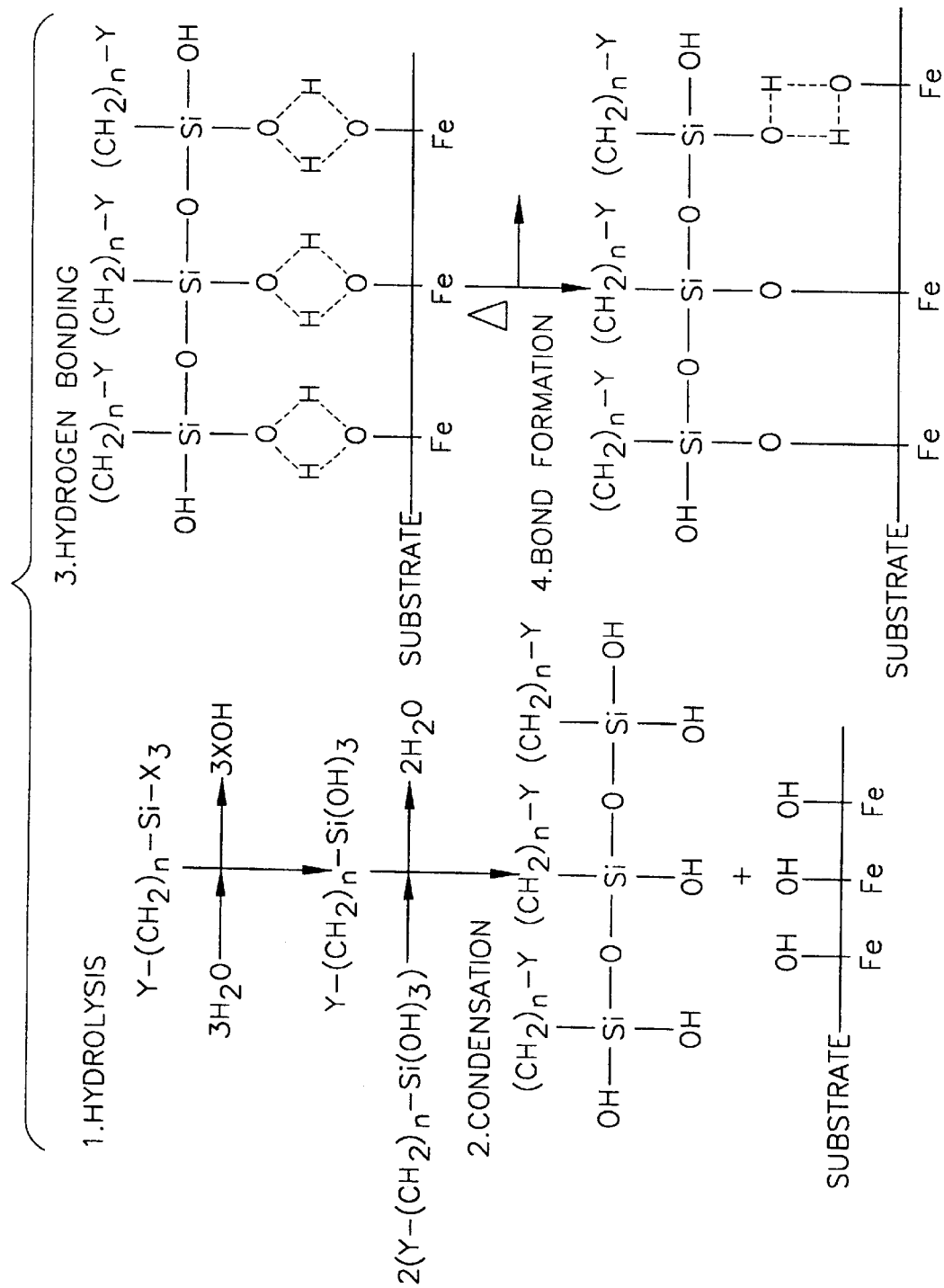
FIG. 6 depicts an Si—C bond forming a bridge between an organofunctional silane coating and an epoxy.

In another embodiment, a steel strip is coated with an organofunctional silane. Organofunctional silane such as Y—R—Si—$X_3$ silane or Y—$(CH_2)_n$—Si—$X_3$, has two classes of functionality, i.e., it is a bi-functional silane. The silane portion, Si, bonds to the inorganic substrate i.e., the steel. The bond between R or $(CH_2)_n$ a bridging group, and Si is a very stable organic bond, while the bond between X, a hydrolyzable group, and the silicon atom in silane is a less stable inorganic bond and can be replaced by a bond between the inorganic substrate (steel) and the silicon atom. Typical hydrolyzable groups X include but are not limited to alkoxy, acyloxy, amine, methoxy, ethoxy and Chlorine. Four exemplary structure formulas of the hydrolyzable group X are presented in FIG. 3. The organofunctional group, Y, is a nonhydrolyzable organic radical that possesses a functionality, which bonds or interacts with organic resins such as epoxy which are typically used to bond the steel strip. Exemplary nonhydrolyzable organic radicals include glycidoxy and amino. Some exemplary nonhydrolyzable organic radical structure formulas are shown in FIG. 4. The bridge between the organofunctional silane coating and an epoxy (e.g., resin) is Si—C bond as shown in FIG. 6. With some organofunctional silanes such as Vinyltriethoxysilane having the formulas shown in FIG. 5, the same group —CH=$CH_2$ (vinyl) forms both the bridging group and the organofunctional group. Organofunctional silane when used as an adhesion promoter can improve the wet/dry/thermal adhesion to a wide range of substrates.

Figure 7:
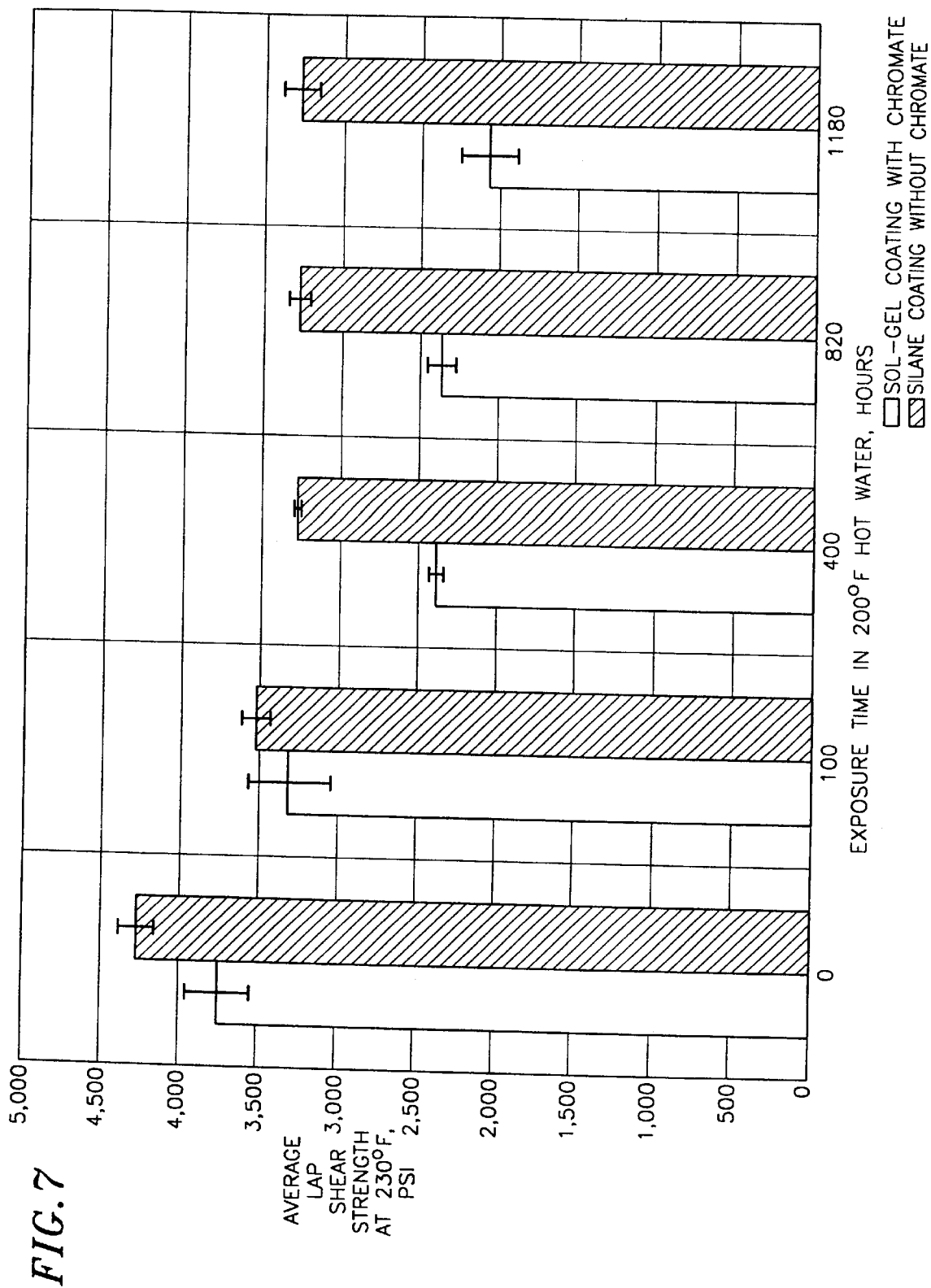
FIG. 7 is a graph of average lap shear strength at 230° F. of bonded steel strips coated with a chromate modified sol-gel and of bonded steel strips coated with an organofunctional silane.

Moreover, applicants have discovered that the use of organofunctional silane as the surface treatment instead of sol-gel modified with Chromate produced a lap shear strength of about 10% higher at 230° F. without hot water exposure and about 25% and 40% higher at 230° F. after 100 and 400 hours of hot water exposure, respectively as shown in FIG. 7.

Figure 8:
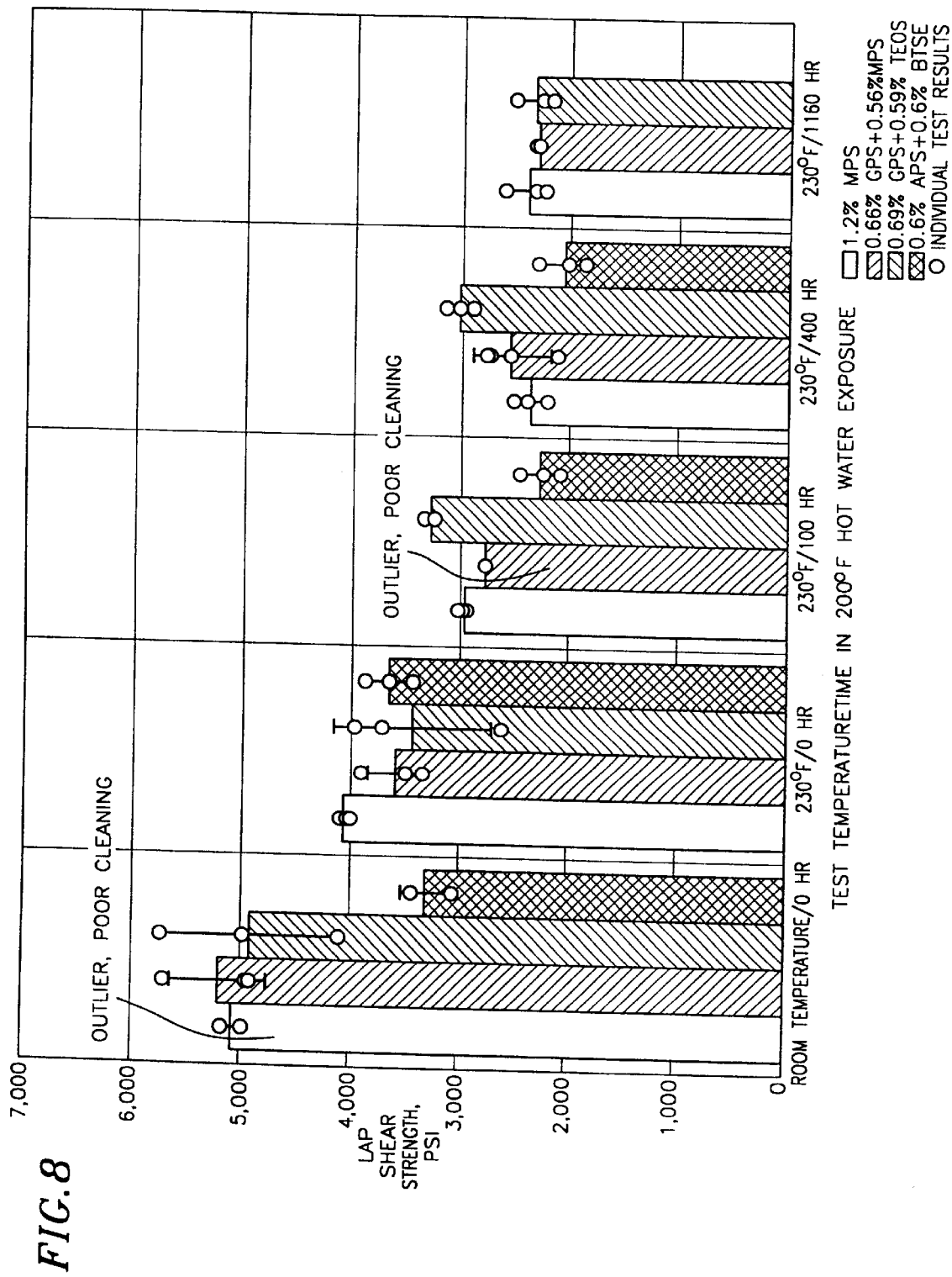
FIG. 8 is a bar graph comparing the lap shear strength of, various organofunctional silanes when exposed to hot water at 230° F. for different amounts of time.

Exemplary organofunctional silanes and their relative strengths under hot wet conditions are depicted in FIG. 8. As can be seen from the legend in FIG. 8, these silanes contain a percentage of one or more of γ-Mercaptopropytrimethoxysilane (MPS), γ-Glycidoxypropyltrimethoxysilane (GPS), γ-Tetraethoxysilane (TEOS), γ-Aminopropyltriethoxysilane (APS), and Bis-1,2-(triethoxysilyl)ethane (BTSE). The structure formulas for MPS, GPS, TEOS, APS, and BTSE are shown in FIG. 9.

Figure 10:
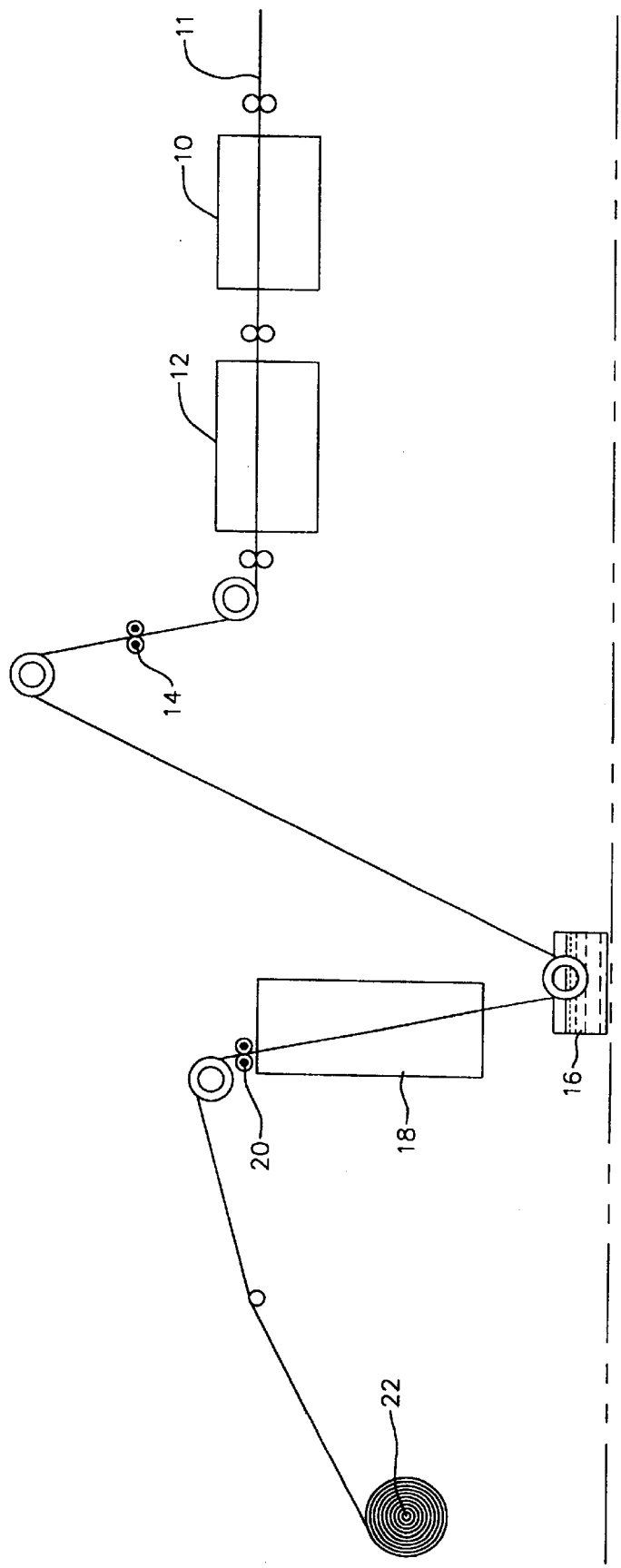
FIG. 10 is a schematic view of a process for coating a steel strip with an adhesion promoter.

A process has been developed by applicants that can coat the steel strips with sol-gel or an organofunctional silane at a speed as high as 50 ft/min. Steel in strip form is typically delivered coated with shipping oil. The inventive process involves the rolling of the steel strip 11 through a washing box 10 containing a washing solution for washing and removing the oils and dirt from the steel (FIG. 10). The steel strip is then rolled through a rinsing box 12 containing a rinsing solution for rinsing the washing solution off the steel strip. The steel strip is then rolled through an air knife 14 which in essence "scrapes" any fluids such as rinsing fluids off the strip. The strip is then rolled through a tank 16 containing sol-gel or silane. The strip is immersed into the sol-gel or silane. From there, the strip is guided through a drying box 18 where the sol-gel or silane is dried onto the steel strip surfaces. The steel strip then proceeds through another air knife 20 which "scrapes" the excess sol-gel or silane off the steel strip surfaces leaving a layer of silane or sol-gel on either surface of the steel strip having a predetermined thickness. From there, the strip is rolled into a roll 22 and is ready to be used in the pipe winding process.

In an alternate embodiment, the sol-gel or organofunctional silane coating is mixed in with the resin that is used to bond the steel strips. In order to obtain a good bond between the strips when mixing the sol-gel or silane with the resin, the steel strips should be thoroughly cleaned.

Because the SSL pipe bonded steel strip formed layers often fail under a combined mode failure, i.e., a shear and peel-off failure, it is desirable for the bonded steel layers to maintain their lap shear strength as well as their peel-off strength under hot and wet conditions. To accomplish this, in a preferred embodiment the present invention incorporates the use of continuous fiber reinforced fillers in the resin used to bond the steel strips and consequently, the steel strip layers. These fillers allow for the control of the bond thickness, improve the shear strength of the bond between steel strips, improve the bond peel strength, reduce resin matrix shrinkage, and increase the resin matrix resistance to cracking.

Exemplary continuous reinforced fiber fillers are made of Kevlar, carbon, and glass. These fillers are preferably in the form of veils e.g., random synthetic veils such as C-glass veils and the random veils manufactured by Reemay and Freudenberg; woven cloths such as boat tape, and roving tapes; unidirectional tapes; and monofilament meshes such as those manufactured by Marquisette and Textie.

Veils are formed using chopped fibers which overlap each other and whose ends may be fused or bonded together. C-glass veils for example, consist of chopped glass fibers which are bonded together using a starch binder. Because the fibers are fused of bonded together, veils, function and are deemed as continuous fiber reinforcement fillers. Veils typically cost less than woven clothes which are formed by weaving fibers. Monofilament mesh is typically priced similarly to the veils.

Veils, woven cloths, tapes and meshes are all in "tape" form, i.e., they are in a continuous layer form and are referred to herein for convenience as "continuous fiber filler". As such, continuous fiber filler can wound over the first steel layer formed by winding a steel strip. The continuous fiber filler is preferably impregnated with the appropriate resin prior to winding around the steel strip pipe layer. This can be accomplished by impregnating with resin at the pipe manufacturing site or by acquiring the continuous fiber filler in pre-impregnated form, i.e., by acquiring the continuous fiber filler already pre-impregnated with the appropriate resin. Alternatively, resin may be applied on to the steel strip layer prior to winding the continuous fiber filler or the resin may be applied over the wound continuous fiber filler. The fiber filler content for continuous fiber filler is typically in the order of 30 to 70% of the total fiber and resin combination volume. However, a high fiber filler content, e.g., a fiber filler content at the higher end of this range or greater is preferred.

The fibers serve as a spacer controlling the spacing between subsequent layers of steel and thereby controlling the bond thickness between the steel layers resulting in an improved peel strength. The continuous fiber filler impregnated with resin can be wound simultaneously with the steel layers at-high speeds, allowing for higher production speeds (since the winding process will not have to be stopped for the application of resin between the strips) while providing a consistent bond thickness throughout the layers.

Figure 11:
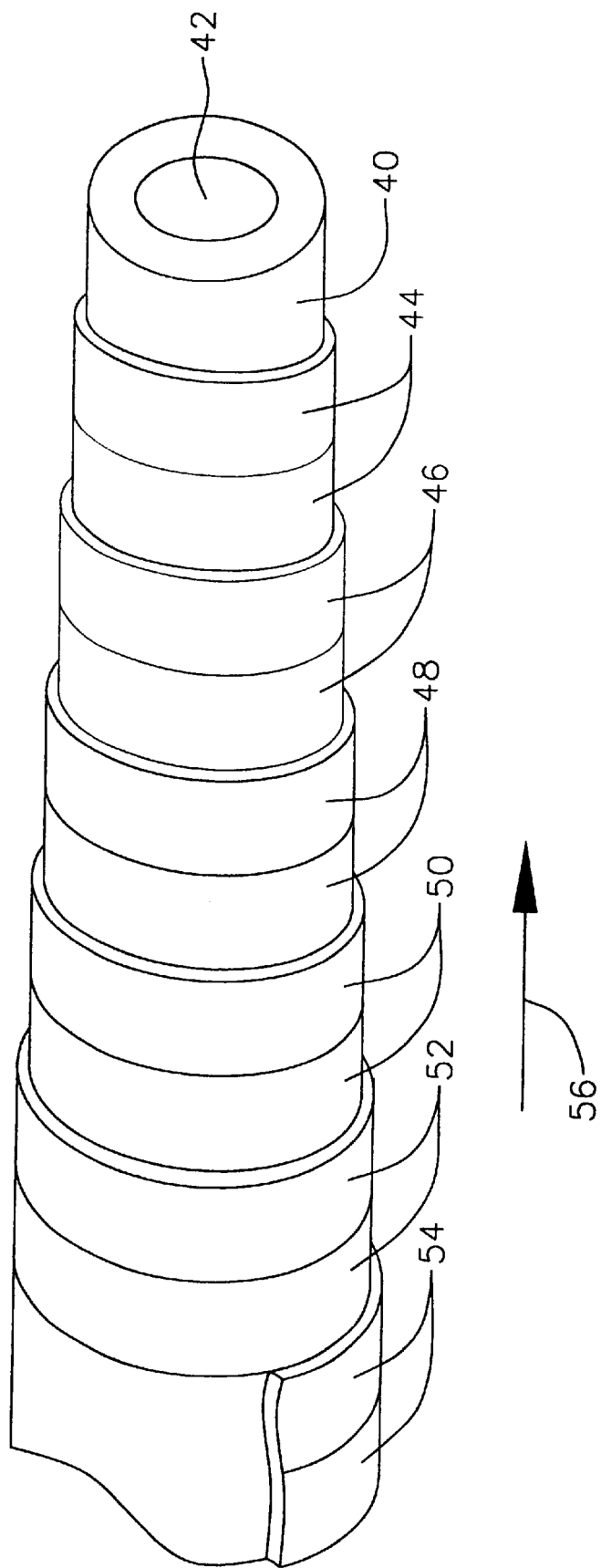
FIG. 11 is a partial side view of a steel strip laminate pipe depicting the various pipe layers.

In a preferred embodiment, the impregnated continuous fiber filler is wound over the inner lining 40 of an SSL pipe on a mandrel 42 simultaneously with the steel strips for forming the SSL pipe. Preferably, the SSL pipe inner lining, steel strips, impregnated continuous fiber filler and outer lining are wound relatively simultaneously. For example, in forming an SSL pipe having three steel layers, the winding of the inner lining over the mandrel is first initiated. As the inner lining 40 is being wound, the winding of the first steel strip 44 over a wound portion of the inner lining is begun, followed by the winding of a first impregnated continuous fiber filler 46 over the wound portion first steel strip 44, followed by the winding of the second steel strip 48 over the wound portion of the first continuous fiber filler 46, followed by the winding of a second impregnated continuous fiber filler 50, followed by the winding of a third steel strip 52, followed by the winding of the pipe outer lining 54 over the wound portion of the third steel strip 50. In this regard, the entire thickness of the pipe is wound as the winding proceeds along the length of the mandrel is the direction shown by arrow 56 in FIG. 11. To improve the winding process, the steel strips are preformed to be predisposed to helical winding.

During winding of the pipe a pinch roll is used to apply a normal force on the wound steel strip so as to remove excess resin between the strips forming adjacent steel layers or between the strip and a pipe lining so as to better control the bond thickness. The normal force applied by the pinch roll causes the excess resin underneath a steel strip to be removed from a free edge of the strip. Furthermore, the normal force applied by the pinch roll enhances the bond between the resin and the steel strip or the resin and the adhesion promoter coating on the steel strip by creating higher surface contact loads.

Figure 12:
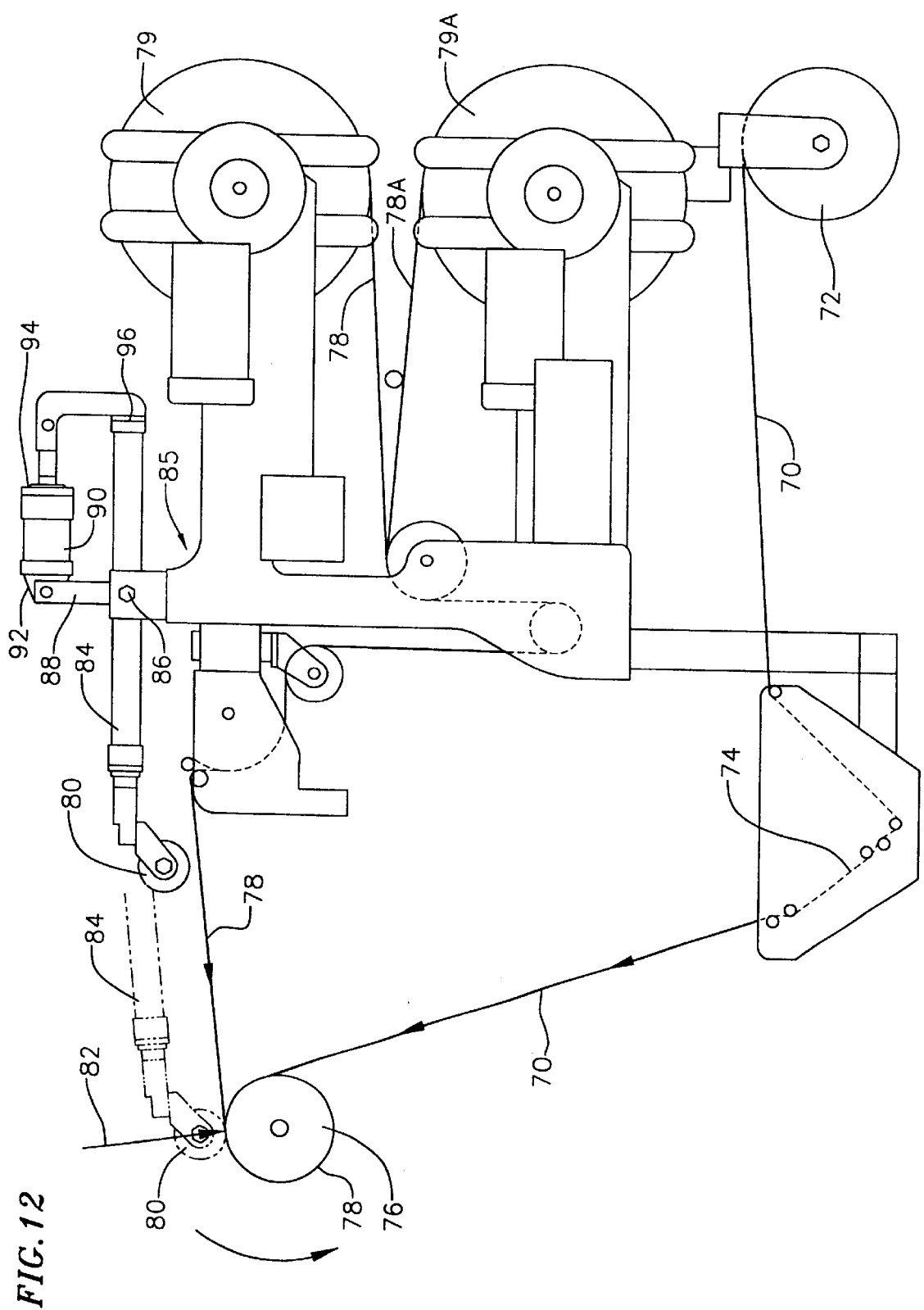
FIG. 12 is a schematic view of a pinch roll mechanism used in the pipe winding process.

The entire SSL winding process can be automated as shown in FIG. 12. There, a first steel layer 78 is formed by winding a steel strip over a lining formed on a mandrel. A continuous fiber filler 70 is then drawn from a drum 72 through an impregnation bath 74 containing resin (FIG. 12). The impregnated continuous fiber filler is then helically wound over the mandrel 76 used in forming the pipe. A second steel strip 78A is helically wound over the impregnated continuous fiber filler over the mandrel. The steel strip is drawn from a drum 79.

In the preferred embodiment, an automated process is used to wind multiple steel strips over the mandrel simultaneously in lagging order. In other words, the winding of the first strip is begun first, followed by the winding of the second strip, and so forth. For example, a steel strip 78 may be drawn from drum 79 and another steel strip 78A may be drawn from a drum 79A as shown in FIG. 12. In this regard, the entire pipe can be wound in a single pass, thereby reducing the time required to form the pipe. Four strips from four different drums have been wound simultaneously by the applicants in forming SSL pipes. Applicants are currently planning to use ten strips from ten different drums simultaneously to wind a pipe.

A pinch roll 80 is used to apply a normal force 82 over each steel strip as it is being wound over the impregnated continuous fiber filler on the mandrel. Typically the roll is connected to an arm 84 which extends to location over the mandrel so as to allow the roll to apply a normal force to the wound steel strip. The arm is pivotally coupled to a fixture 85 about a pivot point 86. The arm can reciprocate for moving the pinch roller to a location over the mandrel. The arm may be pneumatically, hydraulically or electrically driven. A vertical member 88 is also pivotally coupled to the pivot point 86 on the fixture. A front portion 92 of a cylinder 90 is fixed to the member 88 such that the cylinder 90 is in a position relatively parallel to the arm 84. The rear 94 of the cylinder 90 is coupled to a rear portion 96 of the arm. Once the roller is in position over the mandrel, the cylinder 90 retracts causing the arm 84 to rotate (counterclockwise in FIG. 12) and the roll to apply a normal force to the strip.

Instead of using the mechanism described above, a roll with a predetermined weight may be used as the pinch roll for providing the requisite normal force. The roll may itself be of the predetermined weight or a separate weight may be added to the roll.

In an alternate embodiment, instead of using a continuous fiber filler, chopped or crushed fibers may be mixed with the resin in an amount yielding a high fiber content prior to applying the resin over a wound first steel strip layer portion. Alternatively, resin may be applied to the wound steel strip and the crushed or chopped fibers may be applied over the resin.

Because, the fibers themselves can carry load, the addition of the fiber fillers to the resin improves the peel strength and the shear strength of the bond between the steel strip layers of the SSL pipe. Moreover, the high fiber content reduces the shrinkage and thus, the shrinkage stresses developed in the resin during curing, improving the bond strength of the resin. In addition, the use of the fiber filler improves the resistance to crack growth in the resin between the steel strip layers. In essence, the fibers provide a stop to crack growth. The crack will grow into the resin until it reaches a fiber where it will stop. The crack may continue to grow at another portion of the resin and again will stop when it reaches another fiber. This phenomenon can be seen in FIG. 13 which depicts a graph of deflection as a function of load for an SSL pipe under parallel plate loading performed per the ASTM D 2001 standard. As it can be seen, the pipe carries load until a crack is developed at load level 100. As the crack grows with load application, the load drops to level 102. When at load level 102, the crack growth is arrested by a fiber and the specimen begins to carry load again to a load level 104. Another crack begins to grow when at 104 and the load drops to level 106. At level 106 the crack growth is arrested and the specimen begins to carry load again.

In yet a further embodiment instead of a continuous fiber reinforced filler, glass spheres also known as Zeeospheres or microspheres, a discontinuous filler, are used. Zeeospheres are typically made from a ceramic material and are shaped like spheres. Zeeospheres can be hollow or solid. They are manufactured by 3M and Zeelan Industries, Inc.

Due to their spherical shape, Zeeospheres can be densely packed in the resin. Preferably, the resin filled with Zeeospheres should include about 7.5% by weight Zeeospheres. In lab testing, use of Zeeospheres improved the shear strength between the steel strips at hot conditions (i.e., at a temperature of 230° F.). However the load carrying capabilities of an SSL pipe formed with steel strips bonded with a resin filled with Zeeospheres was less than capabilities of an SSL pipe formed with steel strips bonded using a continuous fiber reinforced filler impregnated with resin (FIG. 13). The addition of Zeeospheres also improves the crack growth resistance of the resin matrix as can be seen from FIG. 13. When using a resin filled with Zeeospheres, the bond thickness is controlled by using a squeegee. After a resin with Zeeospheres coating is applied to a strip, excess resin is removed using the squeegee. A pinch roll may also be used to control the bond thickness and to improve the quality of the bond.

Besides bond performance factors of peel strength and lap shear strength at hot conditions and retention of lap shear strength at wet conditions, applicants discovered that other important factors need to be considered in selecting a resin filler. These factors are: (1) resin debulking time, i.e., the amount of time it takes to remove the excess resin between the strips for maximizing the bond strength; (2) ease of application of the filler; and (3) cost of the filler. Debulking time and ease of application of the filler effect the production of SSL pipe, in that if debulking times are long and/or if application of the filler is difficult, the time and costs associated with the SSL pipe production may become excessive. FIG. 14, provides a comparison in relative terms of these factors for woven cloth, monofilament mesh, random synthetic veil and Zeeospheres fillers. Where applicable the data for this table was obtained through testing.

As can be seen from FIG. 14, use of a monofilament mesh allows for a very fast resin debulking time. However, a bond formed with monofilament mesh has a high degradation in shear strength under wet conditions. Random synthetic veil has a good overall balance in the above factors in that it has a high peel strength, a high shear strength in hot conditions, a moderate retention of shear strength in wet conditions, provides for an average resin debulking time, is easy to apply and has a moderate cost. Woven cloth has similar performance characteristics as the random synthetic veil but provides for long resin debulking times and has high material costs. Zeeospheres tend to have low peel strength.

Use of continuous fiber reinforced fillers or Zeeospheres in the resin used to bond the steel strips in SSL pipes improves the operating life of the pipe. These fillers can be used to form a resin matrix that is used to bond steel strips that are treated with an adhesion promoter such as sol-gel or silane, or steel strips that are sandblasted or steel strips that are not treated in any way or form.

Applicants have discovered, however, that the combination of using a adhesion promoter such as sol-gel or an organofunctional silane on the steel strip coupled with the use of the filler described herein provide for improved bond shear strength and for improved peel strength retention at hot and wet operating conditions. From tests conducted by applicants, the results of which are depicted in FIG. 15, it can be seen that the lap shear strength of the bond incorporating Zeeospheres as a filler between steel strips at 230° F. is increased when the steel strips were treated with sol-gel and increased even further when the steel strips were treated with silane. Furthermore, the retention of shear strength at hot wet conditions, also increased from 560 psi after 505 hours of exposure to water at 230° F. to 2360 psi and 3280 psi, when the steel strips were treated with sol-gel and silane, respectively and exposed to hot water at 230° F. for 820 hours.

A comparison of lap shear strengths at different water exposure times at 230° F. of steel strips which are coated with an organofunctional silane and bonded using either G-800 type Zeopheres, a Freudenberg 723020 veil, or a Reemay Type 2270 veil are shown in FIG. 16. As can be seen from FIG. 16, use of Reemay of Freudenberg veils significantly increased the peel strength of the bond even under hot water exposure as shown in FIG. 16 with acceptable increases in resin debulking times.

Although the present invention has been described and illustrated to respect to multiple embodiments thereof, it is to be understood that it is not to be so limited, since changes and modifications may be made therein which are within the full intended scope of this invention as hereinafter claimed.

What is claimed is:

1. A laminate pipe comprising:
   an inner lining defining an inner surface of the pipe;
   a first steel layer formed over the inner lining;
   a second steel layer bonded over the first steel layer, wherein at least one of the first and second steel layers is coated with a sol-gel coating prior to bonding for promoting said bonding; and
   an outer lining over the second steel layer defining an outer surface of the pipe.

2. A laminate pipe as recited in claim 1 further comprising a third steel layer bonded over the second steel layer and under the outer lining, wherein the third steel layer is coated with a sol gel coating prior to bonding for promoting said bonding of the third steel layer.

3. A laminate pipe as recited in claim 1 wherein the sol-gel coating comprises a partially reacted metal-organic precursor.

4. A laminate pipe as recited in claim 1 wherein the sol-gel coating comprises Chromate.

5. A laminate pipe comprising:
   an inner lining defining an inner surface of the pipe;
   a first steel layer formed over the inner lining;
   a second steel layer bonded over the first steel layer, wherein at least one of the first and second steel layers is coated with a silane coating prior to bonding for promoting said bonding; and an outer lining over the second steel layer defining an outer surface of the pipe.

6. A laminate pipe as recited in claim 5 further comprising a third steel layer bonded over the second steel layer and under the outer lining, wherein the third steel layer is coated with a silane coating prior to bonding for promoting said bonding of the third steel layer.

7. A laminate pipe as recited in claim 5 wherein the silane comprises:
   silicon;
   a hydrolyzable group; and
   an non-hydrolyzable organic radical.

8. A laminate pipe comprising:
   an inner lining defining an inner surface of the pipe;
   a steel layer formed over the inner lining by winding as steel strip coated with sol-gel; and
   an outer lining over the steel layer defining an outer surface of the pipe.

9. A laminate pipe as recited in claim 8 wherein the steel layer is a first steel and wherein the pipe further comprises a second steel layer bonded to the first steel layer.

10. A laminate pipe as recited in claim 9 further comprising a sol-gel coating on the second steel layer.

11. A laminate pipe as recited in claim 8 wherein the sol-gel coating comprises a partially reacted metal-organic precursor.

12. A laminate pipe as recited in claim 8 wherein the sol-gel coating comprises Chromate.

13. A laminate pipe comprising:
   an inner lining defining an inner surface of the pipe;
   a steel layer formed over the inner lining by winding a steel strip coated with a silane coating; and
   an outer lining over the steel layer defining an outer surface of the pipe.

14. A laminate pipe as recited in claim 13 wherein the steel layer is a first steel and wherein the pipe further comprises a second steel layer bonded to the first steel layer.

15. A laminate pipe as recited in claim 13 further comprising a silane coating on the second steel layer.

16. A laminate pipe as recited in claim 13 wherein the silane coating comprises:
   silicon;
   a hydrolyzable group; and
   an non-hydrolyzable organic radical.

17. A laminate pipe as recited in claim 1 wherein the first steel layer is formed by winding a first steel strip and wherein the second steel layer is formed by winding a second steel strip and wherein the sol-gel coating is applied to at least one of said first and second steel strips prior to winding.

18. A laminate pipe as recited in claim 5 wherein the first steel layer is formed by winding a first steel strip and wherein the second steel layer is formed by winding a second steel strip and wherein the silane coating is applied to at least one of said first and second steel strips prior to winding.

19. A laminate pipe comprising:
   an inner lining defining an inner surface of the pipe;
   a first steel layer formed over the inner lining;
   a second steel layer bonded over the first steel layer, wherein at least one of the first and second steel layers is coated with a sol-gel coating comprising Chromate prior to bonding; and
   an outer lining over the second steel layer defining an outer surface of the pipe.

20. A laminate pipe comprising:
   an inner lining defining an inner surface of the pipe;
   a steel layer formed over the inner lining;
   a sol-gel coating comprising Chromate on the steel layer; and
   an outer lining over the steel layer defining an outer surface of the pipe.

* * * * *